United States Patent
Gurelli et al.

(10) Patent No.: US 12,191,973 B2
(45) Date of Patent: Jan. 7, 2025

(54) REPEATER-BASED ARCHITECTURE FOR INTELLIGENT REFLECTIVE SURFACE DEPLOYMENT

(71) Applicant: QUALCOMM Incorporated, San Diego, CA (US)

(72) Inventors: Mehmet Izzet Gurelli, San Diego, CA (US); Qiang Wu, San Diego, CA (US); Junyi Li, Fairless Hills, PA (US); Raju Hormis, New York, NY (US); Tao Luo, San Diego, CA (US); Navid Abedini, Basking Ridge, NJ (US); Ozge Koymen, Princeton, NJ (US); Farideddin Fayazbakhsh, Chatham, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 17/461,566

(22) Filed: Aug. 30, 2021

(65) Prior Publication Data
US 2023/0063058 A1    Mar. 2, 2023

(51) Int. Cl.
*H04B 7/155* (2006.01)
*H01Q 15/14* (2006.01)

(52) U.S. Cl.
CPC .......... *H04B 7/155* (2013.01); *H01Q 15/148* (2013.01)

(58) Field of Classification Search
CPC .......... H01Q 15/14; H01Q 3/20; H04B 7/145; H04W 16/28; H04W 16/26
See application file for complete search history.

(56) References Cited

U.S. PATENT DOCUMENTS

2020/0028262 A1* 1/2020 Fang ............... H01Q 3/46

FOREIGN PATENT DOCUMENTS

WO    WO-2021102045 A1 *  5/2021

OTHER PUBLICATIONS

Elmossallamy M.A., et al., "Reconfigurable Intelligent Surfaces for Wireless Communications: Principles, Challenges, and Opportunities", IEEE Transactions on Cognitive Communications and Networking, arXiv:2005.00938v1 [eess.SP], May 2, 2020, pp. 1-12.
(Continued)

*Primary Examiner* — Khalid W Shaheed
(74) *Attorney, Agent, or Firm* — Procopio, Cory, Hargreaves & Savitch

(57) ABSTRACT

A node including an RU and a control entity is disclosed. The node may receive, from a base station at a control entity of the node, an indication of at least one obstruction for communication via at least one reflective surface. The indication may indicate to the control entity to utilize an RU of the node and the at least one reflective surface for communication. The node may configure, upon receiving the indication of the at least one obstruction, the RU and the at least one reflective surface for communication with the base station. The node may forward communication received from, or forward communication to, the base station via the RU and the at least one reflective surface based on the at least one obstruction for communication.

30 Claims, 12 Drawing Sheets

(56) References Cited

OTHER PUBLICATIONS

Tang W., et al., "Wireless Communications with Reconfigurable Intelligent Surface: Path Loss Modeling and Experimental Measurement", IEEE Transactions on Wireless Communications, arXiv:1911.05326v2 [eess.SP], Sep. 14, 2020, pp. 1-32.

Wu Q., et al., "Intelligent Reflecting Surface Aided Wireless Communications: A Tutorial", IEEE Transactions on Communications, arXiv:2007.02759v2 [cs.IT], Jul. 7, 2020, pp. 1-74.

Wu Q., et al., "Towards Smart and Reconfigurable Environment: Intelligent Reflecting Surface Aided Wireless Network", IEEE Communications Magazine, Jan. 2020, pp. 106-112, DOI:10.1109/MCOM.001.1900107.

Zheng B., et al., "Intelligent Reflecting Surface-Enhanced OFDM: Channel Estimation and Reflection Optimization", EEE Wireless Communications Letters, vol. 9, No. 4, Apr. 2020, pp. 1-5, arXiv:1909.03272v3 [cs.IT] [Jan. 29, 2020].

International Search Report and Written Opinion—PCT/US2022/036684—ISA/EPO—Oct. 17, 2022

Ning B., et al., "Channel Estimation and Hybrid Beamforming for Reconfigurable Intelligent Surfaces Assisted THz Communications", Arvix.org, Cornell University Library, 201 OLIN Library Cornell University Ithaca, NY 14853, Dec. 25, 2019, XP081566211, 16 Pages, Abstract Section II.B figures 2,3,6-8.

You C., et al., "How to Deploy Intelligent Reflecting Surfaces in Wireless Network: BS-side, User-Side, or Both Sides?", Arxiv.org, Cornell University Library, 201 OLIN Library Cornell University Ithaca, NY 14853, Dec. 7, 2020, XP081831530, 7 Pages, Figures 1, 2 Abstract Introduction IRS-User Association and Mode Selection IRS Placement and Elements Allocation.

\* cited by examiner

REPEATER-BASED ARCHITECTURE FOR INTELLIGENT REFLECTIVE SURFACE DEPLOYMENT

TECHNICAL FIELD

The present disclosure relates generally to communication systems, and more particularly, to a repeater that may be used in conjunction with an intelligent reflective surface (IRS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station. The apparatus may detect at least one obstruction for communication via at least one reflective surface. The at least one reflective surface may be associated with a node. The node may include a repeater unit (RU) and a control entity. The apparatus may transmit, to the control entity of the node, an indication of the at least one obstruction for communication via the at least one reflective surface. The indication may indicate to the control entity to utilize the RU and the at least one reflective surface for communication. The apparatus may transmit communication to, or receive communication from, one or more UEs via the RU and the at least one reflective surface based on the at least one obstruction for communication.

In an aspect of the disclosure, a method, a computer-readable medium, and an apparatus are provided. The apparatus may be a node. The apparatus may receive, from a base station at a control entity of the node, an indication of at least one obstruction for communication via at least one reflective surface. The indication may indicate to the control entity to utilize an RU of the node and the at least one reflective surface for communication. The apparatus may configure, upon receiving the indication of the at least one obstruction, the RU and the at least one reflective surface for communication with the base station. The apparatus may forward communication received from, or forward communication to, the base station via the RU and the at least one reflective surface based on the at least one obstruction for communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
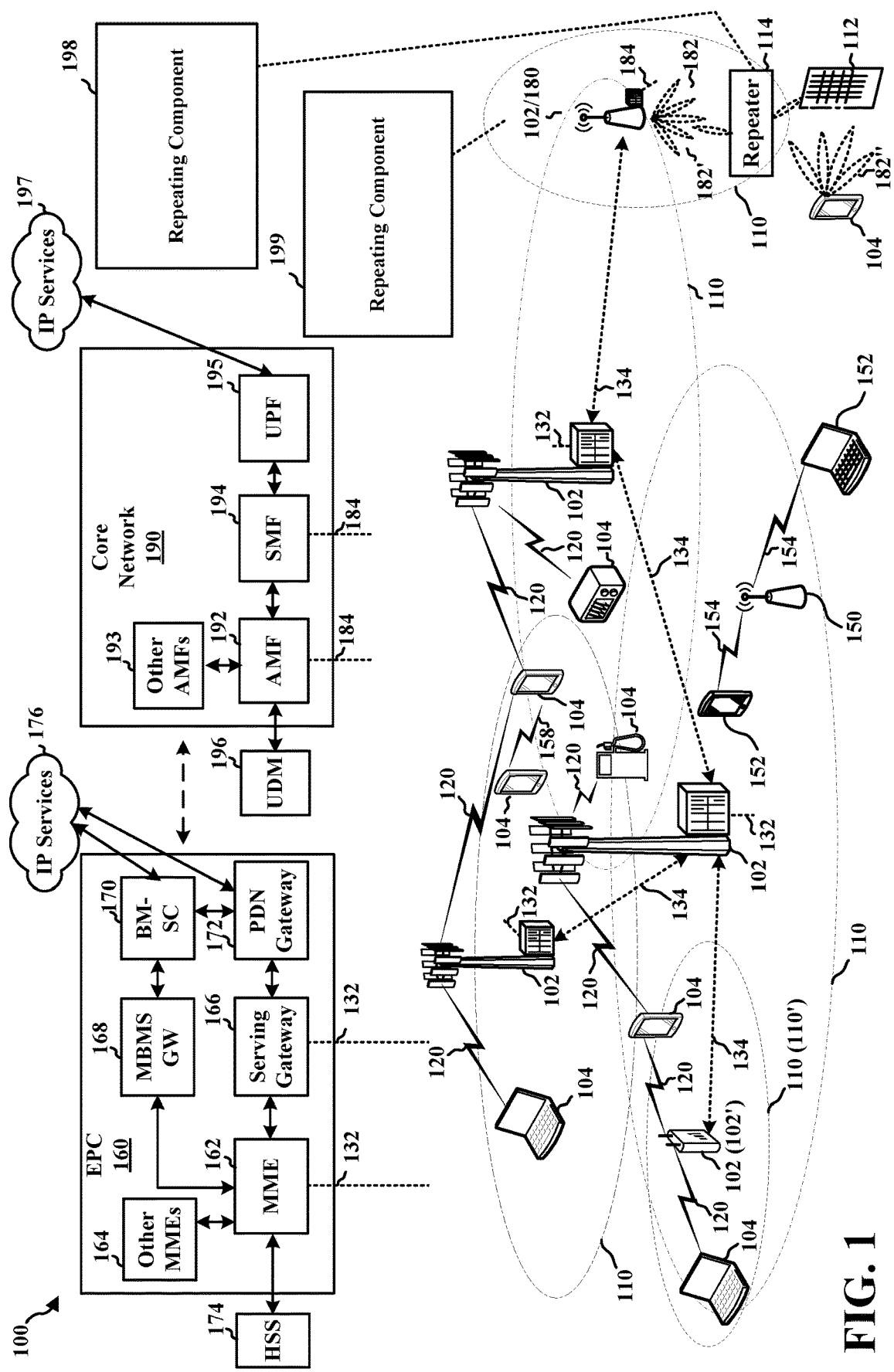
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 180 may include a repeating component 199 that may be configured to detect at least one obstruction for communication via at least one reflective surface. The at least one reflective surface may be associated with a node. The node may include an RU and a control entity. The repeating component 199 may be configured to transmit, to the control entity of the node, an indication of the at least one obstruction for communication via the at least one reflective surface. The indication may indicate to the control entity to utilize the RU and the at least one reflective surface for communication. The repeating component 199 may be configured to transmit communication to, or receive communication from, one or more UEs via the RU and the at least one reflective surface based on the at least one obstruction for communication. In certain aspects, the node 114 may include a repeating component 198 that be configured to receive, from a base station at a control entity of the node, an indication of at least one obstruction for communication via at least one reflective surface. The indication may indicate to the control entity to utilize an RU of the node and the at least one reflective surface for communication. The repeating component 198 may be configured to configure, upon receiving the indication of the at least one obstruction, the RU and the at least one reflective surface for communication with the base station. The repeating component 198 may be configured to forward communication received from, or forward communication to, the base station via the RU and the at least one reflective surface based on the at least one obstruction for communication. Although the following description may be focused on 5G NR, the concepts described herein may be applicable to other similar areas, such as LTE, LTE-A, CDMA, GSM, and other wireless technologies.

Figure 2:
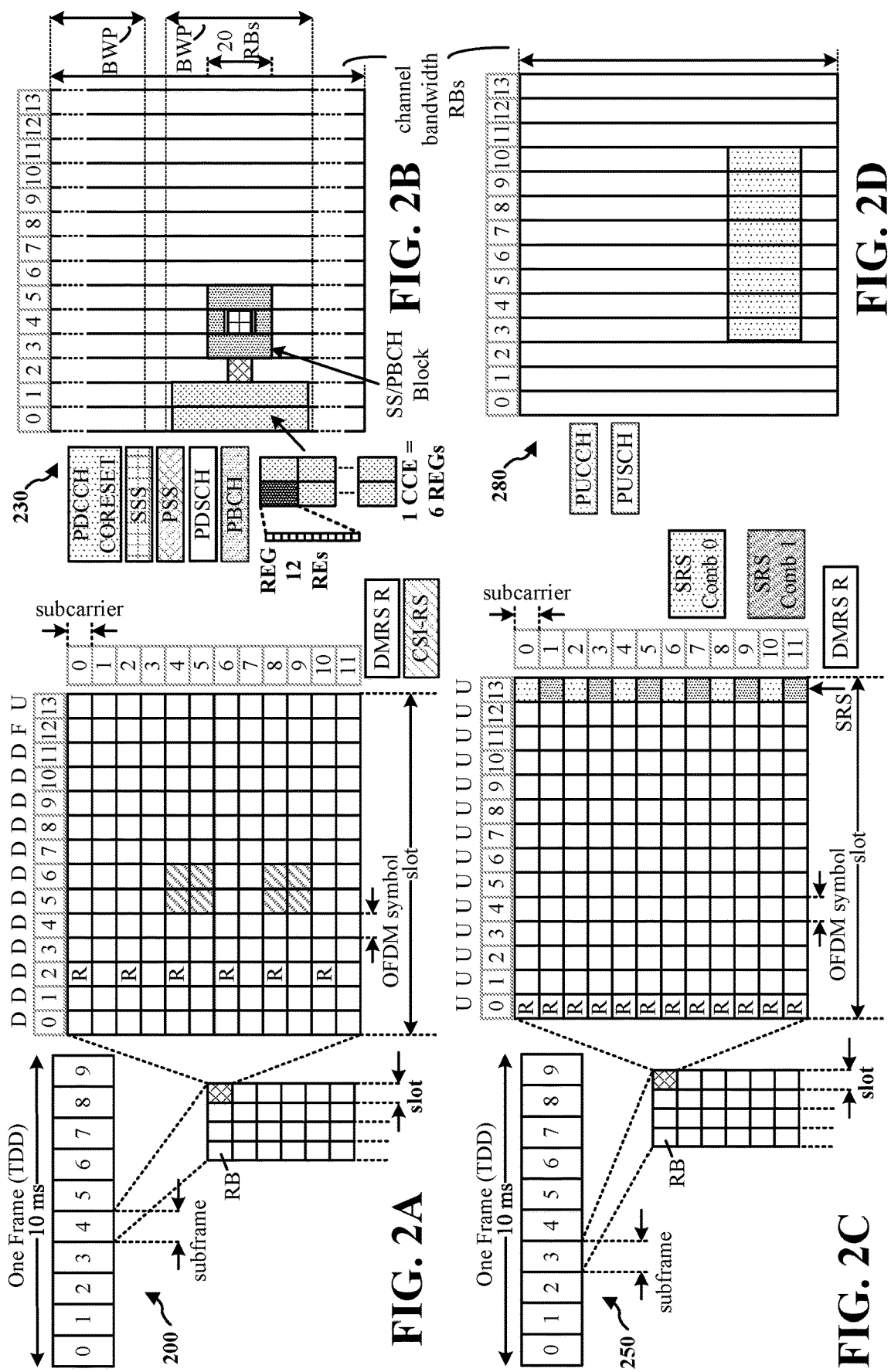
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is approximately 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
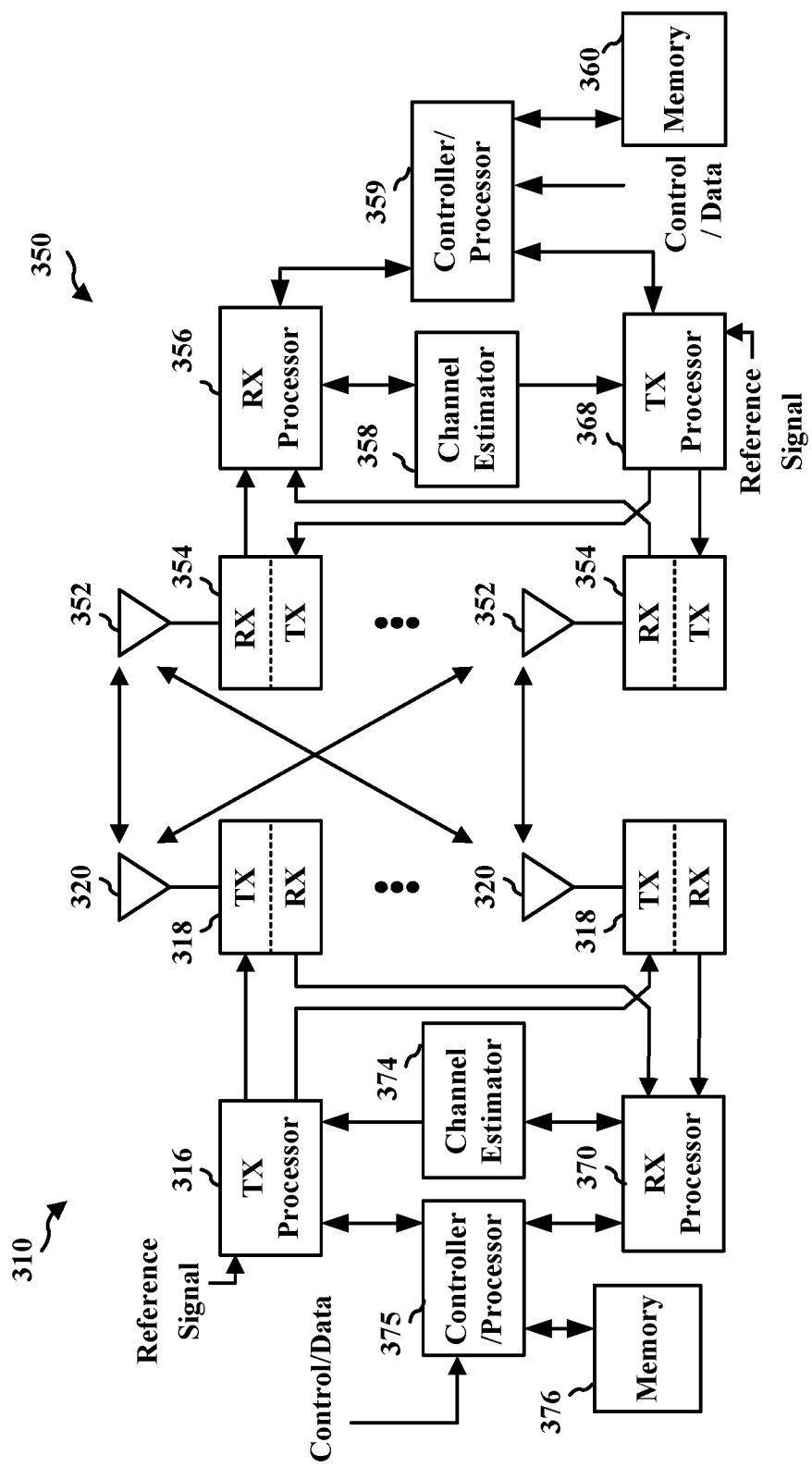
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer protocol data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 199 of FIG. 1.

5G wireless standards have created new opportunities for innovation and unprecedented use cases, such as eMBB, URLLC, and enhanced machine-type communications (eMTC). Among the main drivers behind 5G technologies is the availability of a large amount of spectrum resources, especially at high bands, also known as millimeter wave (mmW) bands. The main challenges of wireless communications at mmW bands may include increased propagation losses, even in line-of-sight (LOS) communications, due to the very short wavelengths and the absorption by various environmental effects. The challenges of wireless communications at mmW bands may also include high diffraction losses that make non-line-of-sight (NLOS) communications difficult.

The success of 5G technologies is closely related to seamless communications at mmW bands. High antenna gains (albeit, with reduced beamwidths) may be implemented and used with massive MIMO to compensate for propagation losses. Network densification may be achieved by providing more closely spaced base stations. Network densification may involve various layers of components, such as base stations, remote-radio-heads (RRHs), various types of repeaters, small-cells, femto-cells, and reflecting surfaces.

Herein reflecting surfaces may include, or may be referred to as, for example, fixed reflecting surfaces, IRSs, reconfigurable intelligent surfaces (RISs), or meta-surfaces, etc.

Figure 4:
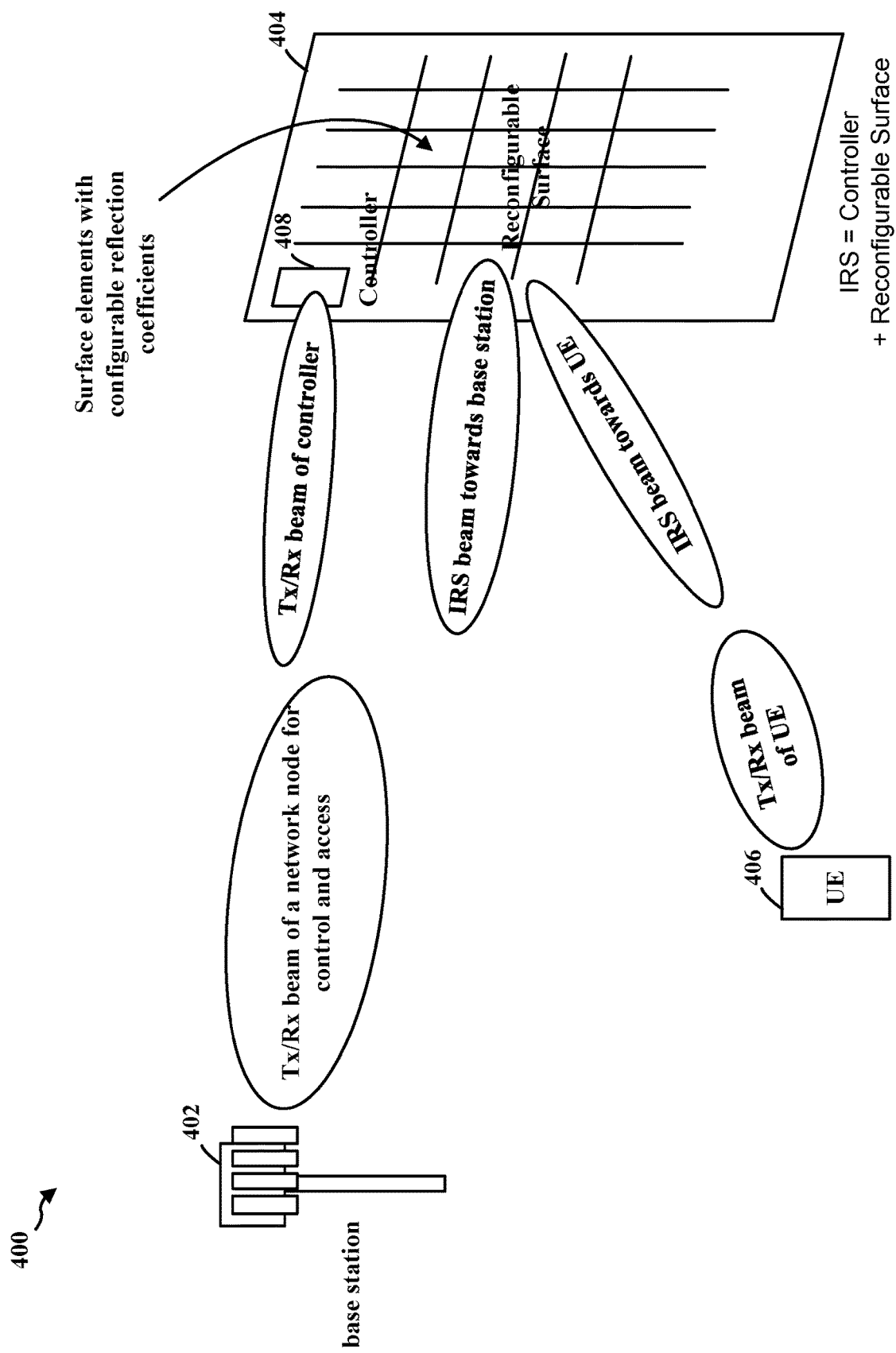
FIG. 4 is a diagram illustrating an environment in which an IRS may operate.

FIG. 4 is a diagram illustrating an environment 400 in which an IRS may operate. An IRS 404 may include a surface with densely packed small surface elements. Each surface element may have a controllable reflection coefficient. By adjusting the reflection coefficient, the phase shift between the incident and reflected rays to and from the corresponding surface element may be controlled. The IRS 404 may be controlled by the controller 408, which may be configured based on an IRS configuration message received from the base station 402. Depending on the implementation, various forms of non-ideal effects may take place. For example, the phase shift may have a limited range, or there may be a gain variation that depends on the phase shift. Depending on the implementation, the surface elements may also be referred to as metaatoms.

When the surface phase (that is, the phases of the surface elements) is properly set, the beam from the base station 402 may be reflected by the IRS 404 toward the UE 406 in downlink. Conversely, the beam from the UE 406 may be reflected by the IRS 404 toward the base station 402 in uplink. Accordingly, the IRS 404 may help to reduce the pathloss and avoid blockages in the LOS propagation. The base station 402 may be any of a base station, an RRH, a repeater, etc. Although herein aspects may be described in relation to 5G NR and mmW bands, the aspects may be equally applicable to other technologies such as 4G LTE, IEEE 802.11 WIFI, or future generations of technologies including beyond 5G, 6G, etc., and to other bands such as the sub-6 GHz bands, terahertz bands, etc.

Figure 5:
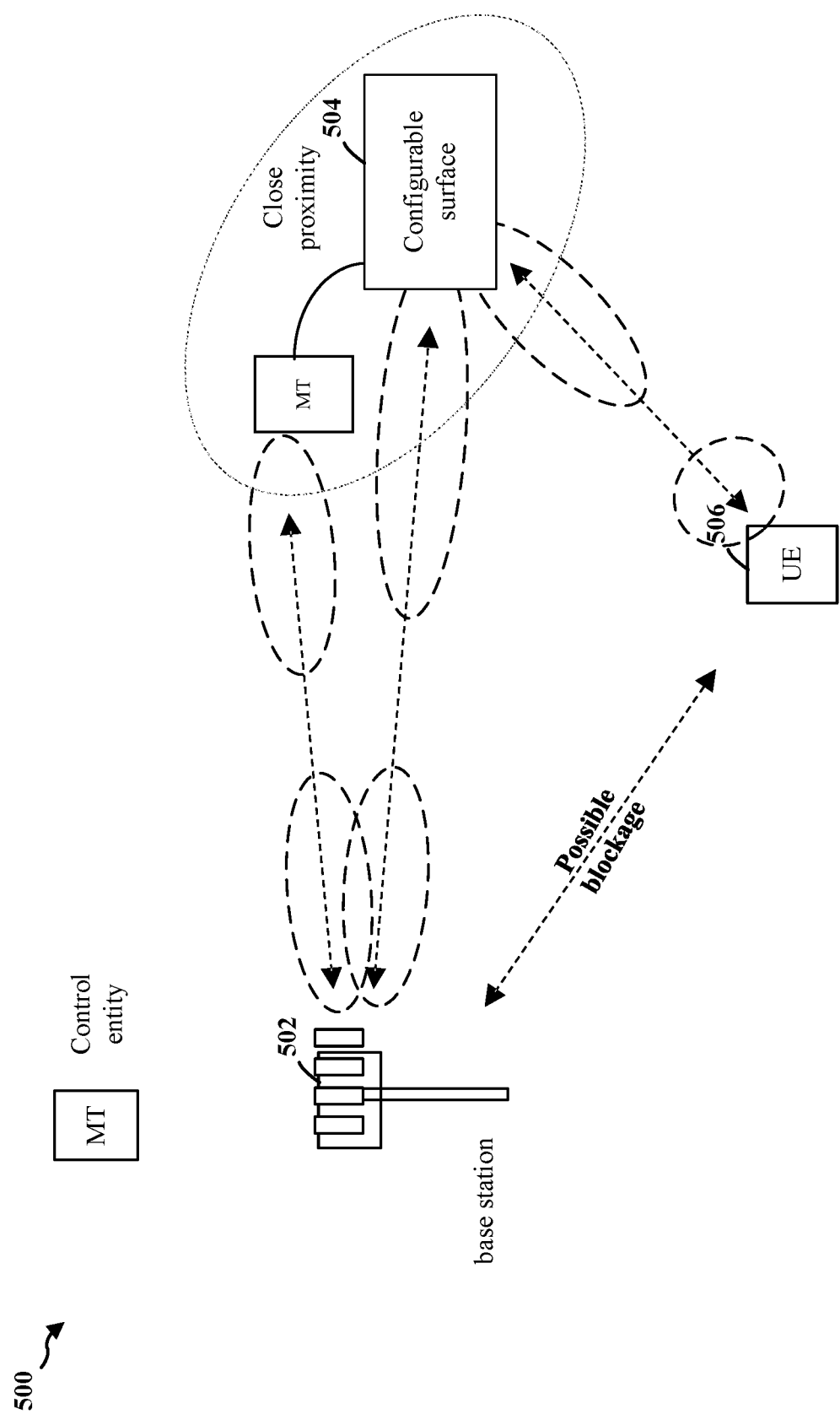
FIG. 5 is a diagram illustrating an environment in which an IRS may operate.

FIG. 5 is a diagram illustrating an environment 500 in which an IRS may operate. The configurable surface 504 and its co-located control entity may have a good view of the base station 502. Accordingly, no obstruction for communication may exist between the configurable surface 504 and the base station 502. For example, an LOS may exist between the configurable surface 504 the base station 502. On the other hand, the UE 506 may not have an LOS to the base station 502. The control entity may control or program the configurable surface 504 so that the configurable surface 504 may reflect the signals from the base station 502 towards the UE 506 on the downlink (and vice versa on the uplink).

An IRS may not perform well if the IRS does not have a good view of the base station. It may be important that the IRS receives a strong signal so that the IRS may reflect the signal towards UEs at a sufficiently strong power level.

Aspects described herein may relate to the use of a repeater co-located with the control entity of the IRS. Herein the repeater may also be referred to as the repeater unit (RU). The repeater and the control entity may be disposed in the same housing or enclosure, and may be collectively referred to as a node. The node including the repeater may have a good or unimpeded view of the base station. In other words, the control entity and the repeater may be placed at a location where they may receive signals from the base station with a sufficiently strong power level. Accordingly, no obstruction for communication may exist between the node and the base station. For example, an LOS may exist between the node and the base station.

The configurable surface may be disposed where the configurable surface may have a good or unimpeded view toward both the repeater and the UEs served by the configurable surface. The control entity of the node may control both the repeater and the configurable surface. The control entity of the node may in turn be controlled by the base station.

In the downlink, the repeater may utilize one or more fixed or steerable beams to repeat the signal power from the base station to one or more configurable reflective surfaces. The control entity may control the direction of the repeater beams, in case of steerable beams, as well as the on or off status (activation status) of each of the repeater beams. At the same time, the control entity may control the surface phases of the configurable reflective surface so that the configurable reflective surface may reflect those beams from the repeater towards the UEs.

Although operations associated with downlink transmissions have been described, aspects may also relate to the mirror operations in the uplink. In particular, in the uplink, the UE may transmit a signal toward the reflective surface. The reflective surface may reflect the signal from the UE toward the repeater. Finally, the repeater may repeat the signal received form the reflective surface and transmit the signal toward the base station.

Figure 6:
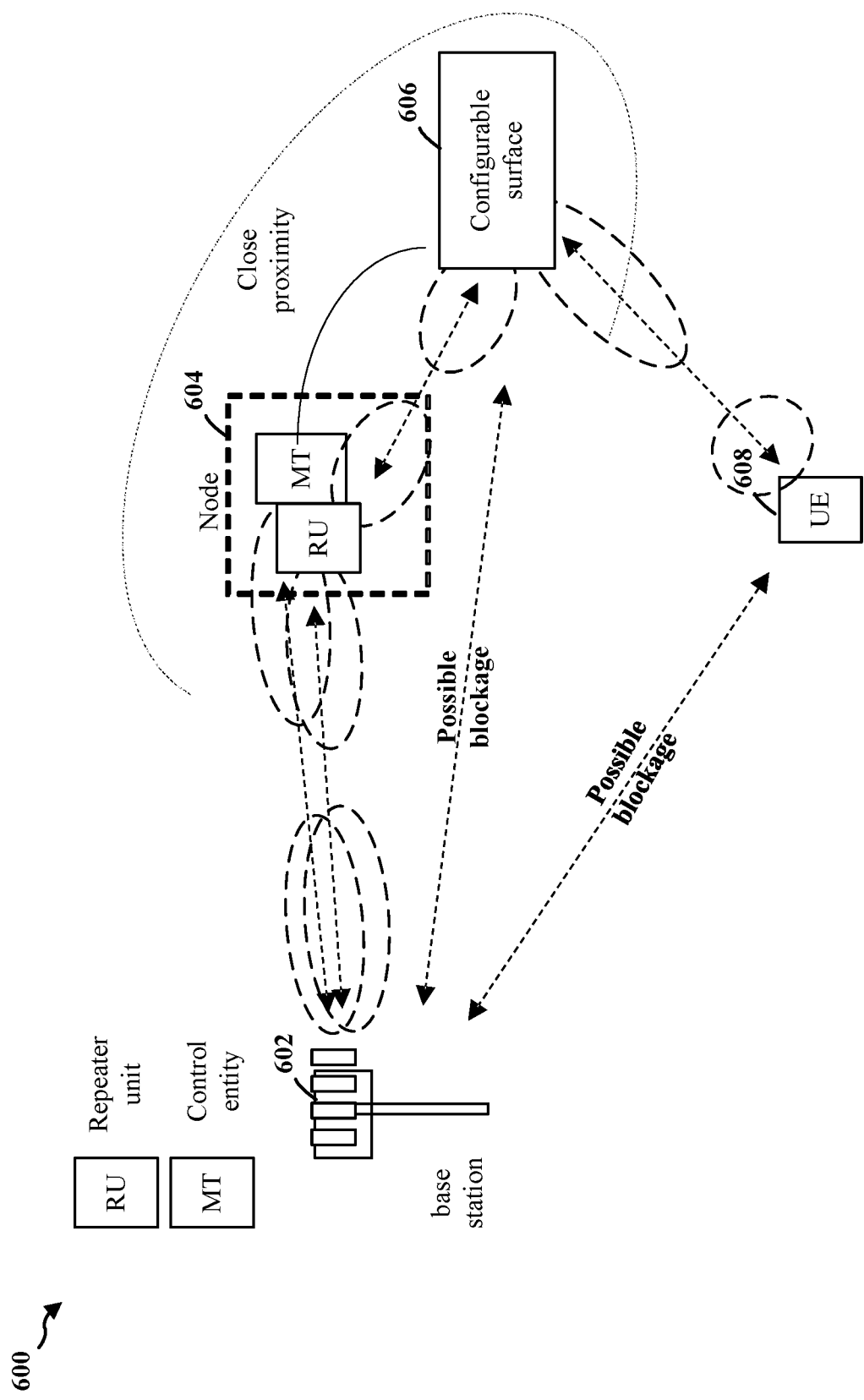
FIG. 6 a diagram illustrating an environment in which aspects of the disclosure may be practiced.

FIG. 6 is a diagram illustrating an environment 600 in which aspects of the disclosure may be practiced. The control entity of the node 604 may be placed at a location where it may have a good or unimpeded view of the base station 602. Accordingly, no obstruction for communication may exist between the node 604 and the base station 602. For example, an LOS may exist between the node 604 and the base station 602. In one example, the configurable surface 606 may be indoors, such that it may not have a good or unimpeded view of the base station 602. Accordingly, an obstruction for communication may exist between the configurable surface 606 and the base station 602. For example, an LOS may not exist between the configurable surface 606 and the base station 602. The RU co-located with the control entity in the node 604 may have a good or unimpeded view of both the base station 602 and the configurable surface 606.

The base station 602 may transmit control messages relating to the RU and the reflective surface 606 to the control entity of the node 604 via DCI messages. The control entity of the node 604 may set the beam direction of the RU as well as the surface phase of the configurable surface 606 so that the beam from the base station 602 may be repeated by the RU towards the configurable reflective surface 606, and then reflected by the configurable reflective surface 606 towards the UE 608.

In one configuration, the RU may be a simple amplify-and-forward repeater using one or more fixed or steerable beams. The RU beams may be configured, or may be turned on or off based on control messages generated by either the base station 602 or the control entity. The output power of the RU may not be too high (e.g., it may be below a predefined threshold) due to the proximity of the RU to the reflective surface 606. Accordingly, any potential stability issues (e.g., due to leakage from the transmitter to the receiver) may be alleviated. The proximity of the RU to the surface may also help with better control of the whole configuration, and it may also be beneficial for producing broadcast beams.

In one example scenario, configurable surfaces 606 may be installed on large walls of an indoor venue, e.g., a food court, but the configurable surfaces 606 may not have an LOS to any base station 602. The node 604 may be placed at a suitable place outside with a view towards the inside. Accordingly, no obstruction for communication may exist between a base station 602 and the node 604. For example, an LOS may exist between a base station 602 and the node 604, and between the node 604 and one or more configurable surfaces 606. The control entity of the node 604 may orchestrate the RU beams and the surface phase of the configurable surfaces 606.

Figure 7:
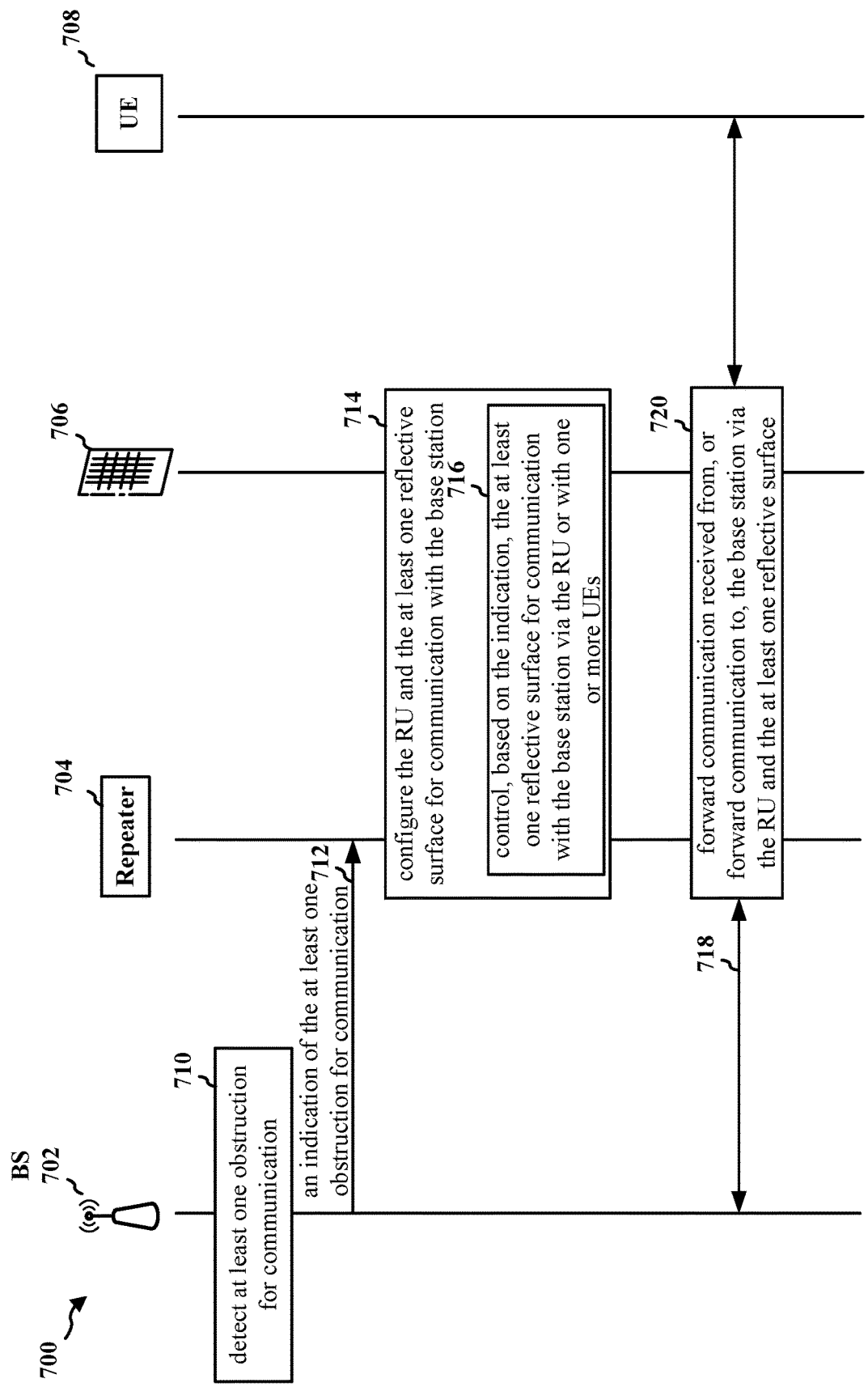
FIG. 7 is a diagram illustrating a communication flow of a method of wireless communication.

FIG. 7 is a diagram illustrating a communication flow 700 of a method of wireless communication. The base station 702 may correspond to the base station 102/180/310/602. The node 704 may correspond to the node 114/604. The reflective surface 706 may correspond to the reflective surface 112/606. The UE 708 may correspond to the UE 104/350/608. At 710, the base station 702 may detect at least one obstruction for communication via at least one reflective surface 706. The at least one reflective surface may be associated with a node 704. The node 704 may include an RU and a control entity. At 712, the base station 702 may transmit to the control entity of the node 704, and the node 704, may receive from the base station 702 at the control entity, an indication of the at least one obstruction for communication via the at least one reflective surface 706. The indication may indicate to the control entity to utilize the RU and the at least one reflective surface 706 for communication. At 714, the node may configure, upon receiving the indication of the at least one obstruction, the RU and the at least one reflective surface 706 for communication with the base station 702. At 716, the node may control, based on the indication, the at least one reflective surface 706 for communication with the base station via the RU or with one or more UEs. At 718, the base station may transmit communication to, or receive communication from, one or more UEs, e.g., UE 708, via the RU and the at least one reflective surface 706 based on the at least one obstruction for communication. At 720, the node may forward communication received from, or forward communication to, the base station 702 via the RU and the at least one reflective surface 706 based on the at least one obstruction for communication.

Figure 8:
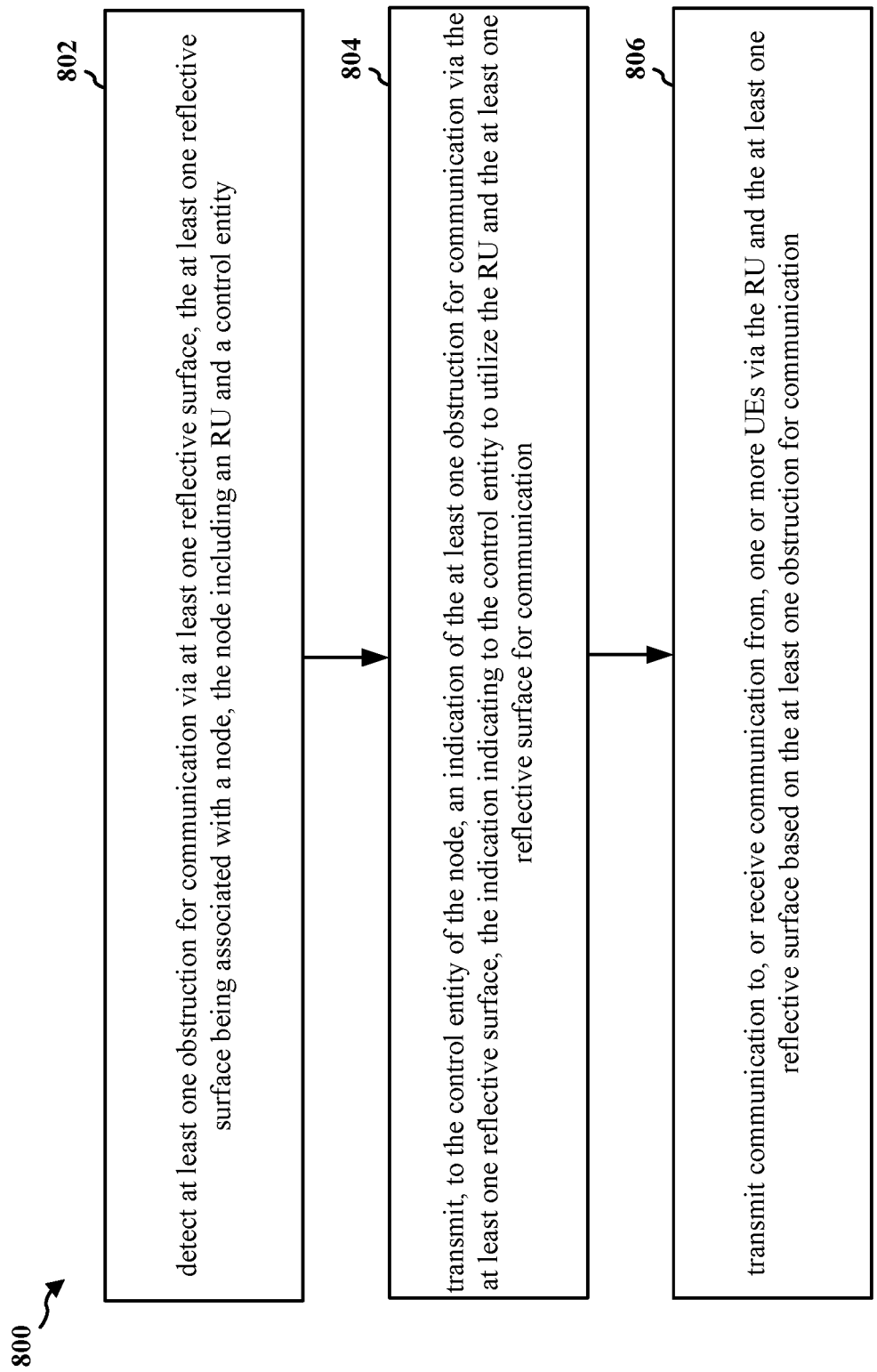
FIG. 8 is a flowchart of a method of wireless communication.

FIG. 8 is a flowchart 800 of a method of wireless communication. The method may be performed by a base station (e.g., the base station 102/180/310/602/702; the apparatus 1102). At 802, the base station may detect at least one obstruction for communication via at least one reflective surface. The at least one reflective surface may be associated with a node. The node may include an RU and a control entity. For example, 802 may be performed by a repeating component 1140 in FIG. 11. Referring to FIG. 7, at 710, the base station 702 may detect at least one obstruction for communication via at least one reflective surface 706.

At 804, the base station may transmit, to the control entity of the node, an indication of the at least one obstruction for communication via the at least one reflective surface. The indication may indicate to the control entity to utilize the RU and the at least one reflective surface for communication. For example, 804 may be performed by a repeating component 1140 in FIG. 11. Referring to FIG. 7, at 712, the base station 702 may transmit, to the control entity of the node 704, an indication of the at least one obstruction for communication via the at least one reflective surface 706.

At 806, the base station may transmit communication to, or receive communication from, one or more UEs via the RU and the at least one reflective surface based on the at least one obstruction for communication. For example, 806 may be performed by a repeating component 1140 in FIG. 11. Referring to FIG. 7, at 718, the base station 702 may transmit communication to, or receive communication from, one or more UEs via the RU and the at least one reflective surface based on the at least one obstruction for communication.

In one configuration, the at least one obstruction for communication may be associated with an absence of a line-of-sight between the base station and the at least one reflective surface.

In one configuration, no obstruction for communication may exist between the base station and the node.

In one configuration, no obstruction for communication may exist between the node and the at least one reflective surface.

In one configuration, the indication may configure the node to control the at least one reflective surface for communication with the base station via the RU or with the one or more UEs.

In one configuration, the indication may configure the control entity of the node to control the RU. The RU may be associated with one or more fixed beams toward the base station. An activation state of the one or more fixed beams may be based on the indication.

In one configuration, the indication may configure the control entity of the node to control the RU. The RU may be associated with one or more steerable beams toward the base station. At least one of an activation state or a direction of the one or more steerable beams may be based on the indication.

In one configuration, the indication may configure the control entity of the node to control the RU. The RU may be associated with one or more fixed beams toward the at least one reflective surface. An activation state of the one or more fixed beams may be based on the indication.

In one configuration, the indication may configure the control entity of the node to control the RU. The RU may be associated with one or more steerable beams toward the at least one reflective surface. At least one of an activation state or a direction of the one or more steerable beams may be based on the indication.

In one configuration, based on the indication, a transmit power of at least one transmit beam of the RU toward the at least one reflective surface may be below a predefined threshold.

Figure 9:
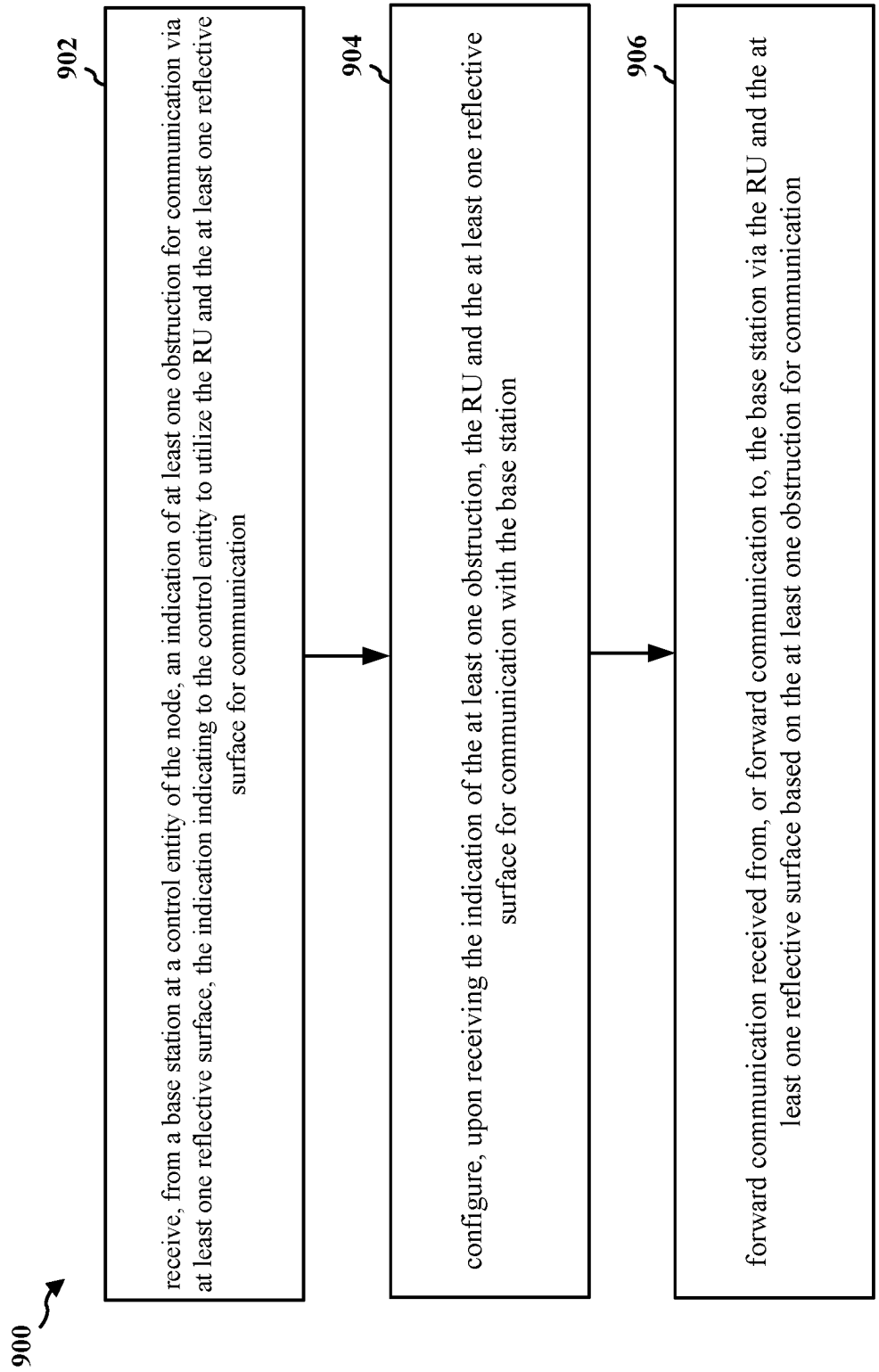
FIG. 9 is a flowchart of a method of wireless communication.

FIG. 9 is a flowchart 900 of a method of wireless communication. The method may be performed by a node (e.g., the node 114/604/704; the apparatus 1202). At 902, the node may receive, from a base station at a control entity of the node, an indication of at least one obstruction for communication via at least one reflective surface. The indication may indicate to the control entity to utilize an RU of the node and the at least one reflective surface for communication. For example, 902 may be performed by the repeating component 1240 in FIG. 12. Referring to FIG. 7, at 712, the node 704 may receive, from a base station 702 at a control entity of the node 704, an indication of at least one obstruction for communication via at least one reflective surface 706.

At 904, the node may configure, upon receiving the indication of the at least one obstruction, the RU and the at least one reflective surface for communication with the base station. For example, 904 may be performed by the repeating component 1240 in FIG. 12. Referring to FIG. 7, at 714, the node 704 may configure, upon receiving the indication of the at least one obstruction, the RU and the at least one reflective surface 706 for communication with the base station 702.

At 906, the node may forward communication received from, or forward communication to, the base station via the RU and the at least one reflective surface based on the at least one obstruction for communication. For example, 906 may be performed by the repeating component 1240 in FIG. 12. Referring to FIG. 7, at 720, the node 704 may forward communication received from, or forward communication to, the base station 702 via the RU and the at least one reflective surface 706 based on the at least one obstruction for communication.

Figure 10:
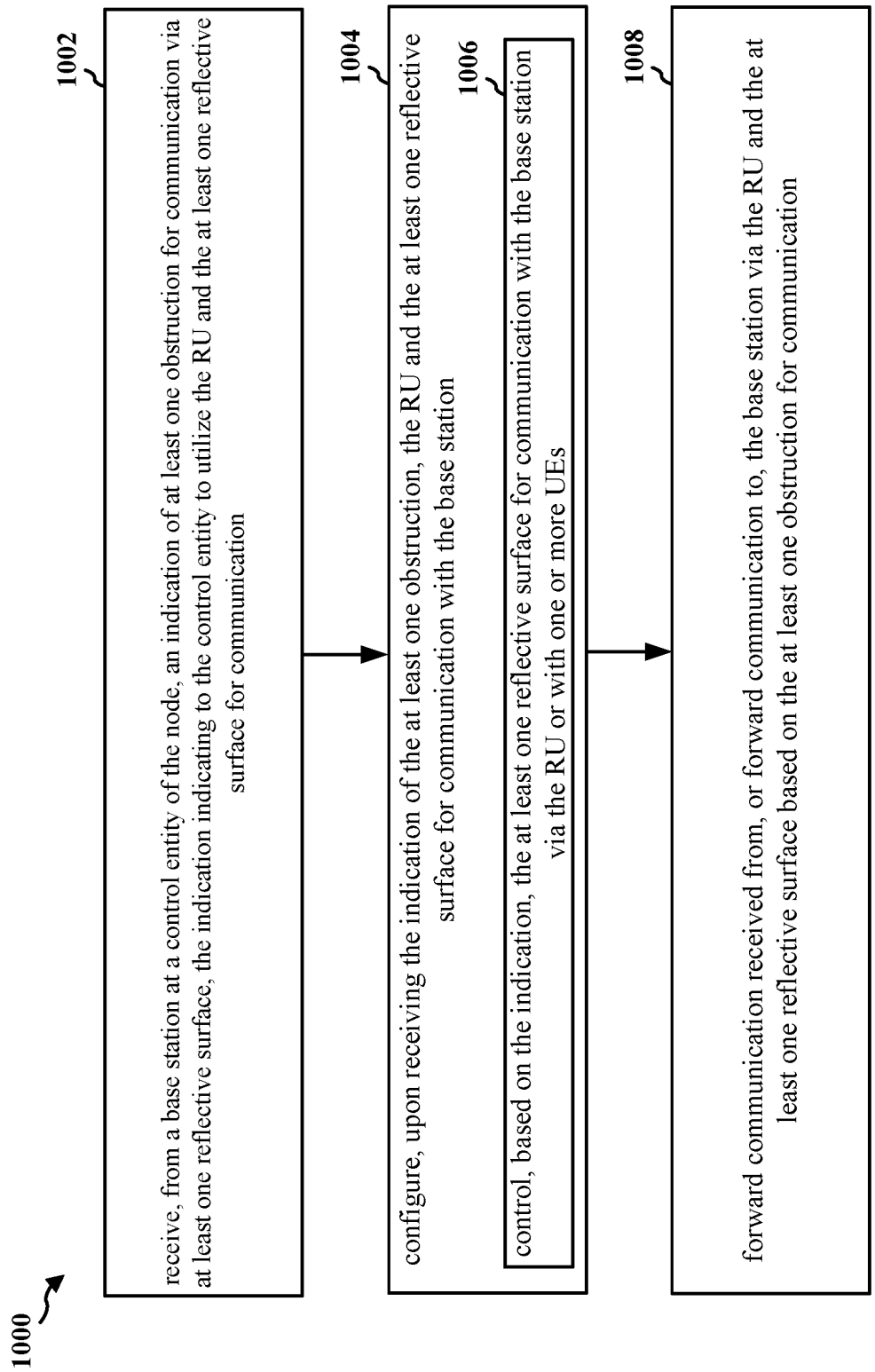
FIG. 10 is a flowchart of a method of wireless communication.

FIG. 10 is a flowchart 1000 of a method of wireless communication. The method may be performed by a node (e.g., the node 114/604/704; the apparatus 1202). At 1002, the node may receive, from a base station at a control entity of the node, an indication of at least one obstruction for communication via at least one reflective surface. The indication may indicate to the control entity to utilize an RU of the node and the at least one reflective surface for communication. For example, 1002 may be performed by the repeating component 1240 in FIG. 12. Referring to FIG. 7, at 712, the node 704 may receive, from a base station 702 at a control entity of the node 704, an indication of at least one obstruction for communication via at least one reflective surface 706.

At 1004, the node may configure, upon receiving the indication of the at least one obstruction, the RU and the at least one reflective surface for communication with the base station. For example, 1004 may be performed by the repeating component 1240 in FIG. 12. Referring to FIG. 7, at 714, the node 704 may configure, upon receiving the indication of the at least one obstruction, the RU and the at least one reflective surface 706 for communication with the base station 702.

At 1008, the node may forward communication received from, or forward communication to, the base station via the RU and the at least one reflective surface based on the at least one obstruction for communication. For example, 1008 may be performed by the repeating component 1240 in FIG. 12. Referring to FIG. 7, at 720, the node 704 may forward communication received from, or forward communication to, the base station 702 via the RU and the at least one reflective surface 706 based on the at least one obstruction for communication.

In one configuration, the at least one obstruction for communication may be associated with an absence of a line-of-sight between the base station and the at least one reflective surface.

In one configuration, no obstruction for communication may exist between the base station and the node.

In one configuration, no obstruction for communication may exist between the node and the at least one reflective surface.

In one configuration, at 1006, the node may control, based on the indication, the at least one reflective surface for communication with the base station via the RU or with one or more UEs. For example, 1006 may be performed by the repeating component 1240 in FIG. 12. Referring to FIG. 7, at 716, the node 704 may control, based on the indication, the at least one reflective surface 706 for communication with the base station 702 via the RU or with one or more UEs 708.

In one configuration, the RU may be associated with one or more beams toward the base station or the at least one reflective surface. Each of the one or more beams may be fixed or steerable.

In one configuration, the control entity of the node may control the RU based on the indication.

In one configuration, the control entity may control at least one of an activation state or a direction of the one or more beams associated with the RU.

In one configuration, the control entity may control the at least one of the activation state or the direction of the one or more beams associated with the RU based on the indication.

In one configuration, a transmit power of at least one transmit beam of the RU toward the at least one reflective surface may be below a predefined threshold.

Figure 11:
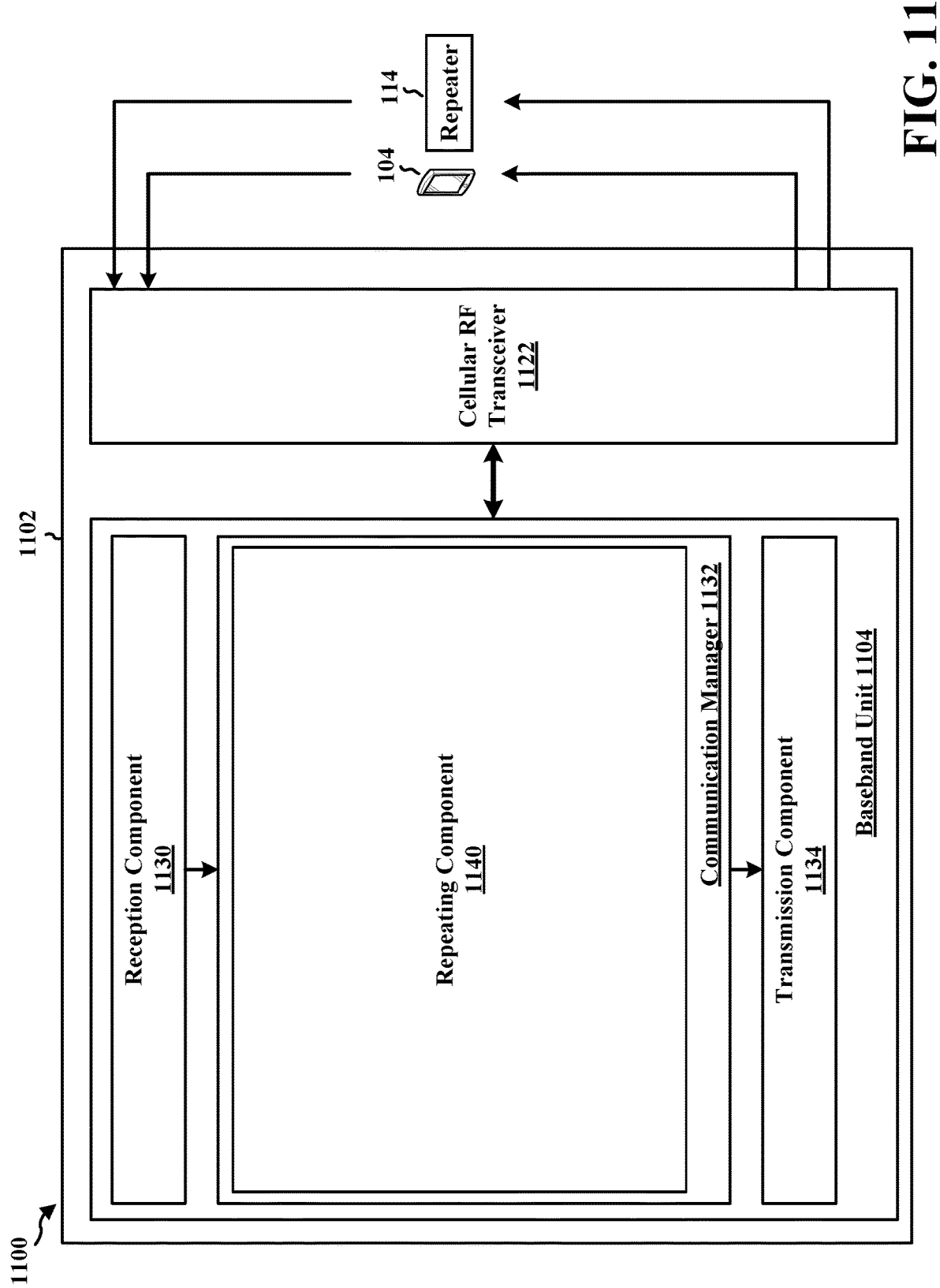
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 104 or the repeater 114. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a repeating component 1140 that may be configured to detect at least one obstruction for communication via at least one reflective surface, the at least one reflective surface being associated with a node, the node including an RU and a control entity, e.g., as described in connection with 802 in FIG. 8. The repeating component 1140 may be configured to transmit, to the control entity of the node, an indication of the at least one obstruction for communication via the at least one reflective surface, the indication indicating to the control entity to utilize the RU and the at least one reflective surface for communication, e.g., as described in connection with 804 in FIG. 8. The repeating component 1140 may be configured to transmit communication to, or receive communication from, one or more UEs via the RU and the at least one reflective surface based on the at least one obstruction for communication, e.g., as described in connection with 806 in FIG. 8.

The apparatus may include additional components that perform each of the blocks of the algorithm in the flowcharts of FIGS. 7 and 8. As such, each block in the flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for detecting at least one obstruction for communication via at least one reflective surface, the at least one reflective surface being associated with a node, the node including an RU and a control entity. The apparatus 1102 may include means for transmitting, to the control entity of the node, an indication of the at least one obstruction for communication via the at least one reflective surface, the indication indicating to the control entity to utilize the RU and the at least one reflective surface for communication. The apparatus 1102 may include means for transmitting communication to, or receiving communication from, one or more UEs via the RU and the at least one reflective surface based on the at least one obstruction for communication.

In one configuration, the at least one obstruction for communication may be associated with an absence of a line-of-sight between the base station and the at least one reflective surface. In one configuration, no obstruction for communication may exist between the base station and the node. In one configuration, no obstruction for communication may exist between the node and the at least one reflective surface. In one configuration, the indication may configure the node to control the at least one reflective surface for communication with the base station via the RU or with the one or more UEs. In one configuration, the indication may configure the control entity of the node to control the RU. The RU may be associated with one or more fixed beams toward the base station. An activation state of the one or more fixed beams may be based on the indication. In one configuration, the indication may configure the control entity of the node to control the RU. The RU may be associated with one or more steerable beams toward the base station. At least one of an activation state or a direction of the one or more steerable beams may be based on the indication. In one configuration, the indication may configure the control entity of the node to control the RU. The RU may be associated with one or more fixed beams toward the at least one reflective surface. An activation state of the one or more fixed beams may be based on the indication. In one configuration, the indication may configure the control entity of the node to control the RU. The RU may be associated with one or more steerable beams toward the at least one reflective surface. At least one of an activation state or a direction of the one or more steerable beams may be based on the indication. In one configuration, based on the indication, a transmit power of at least one transmit beam of the RU toward the at least one reflective surface may be below a predefined threshold.

The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 12:
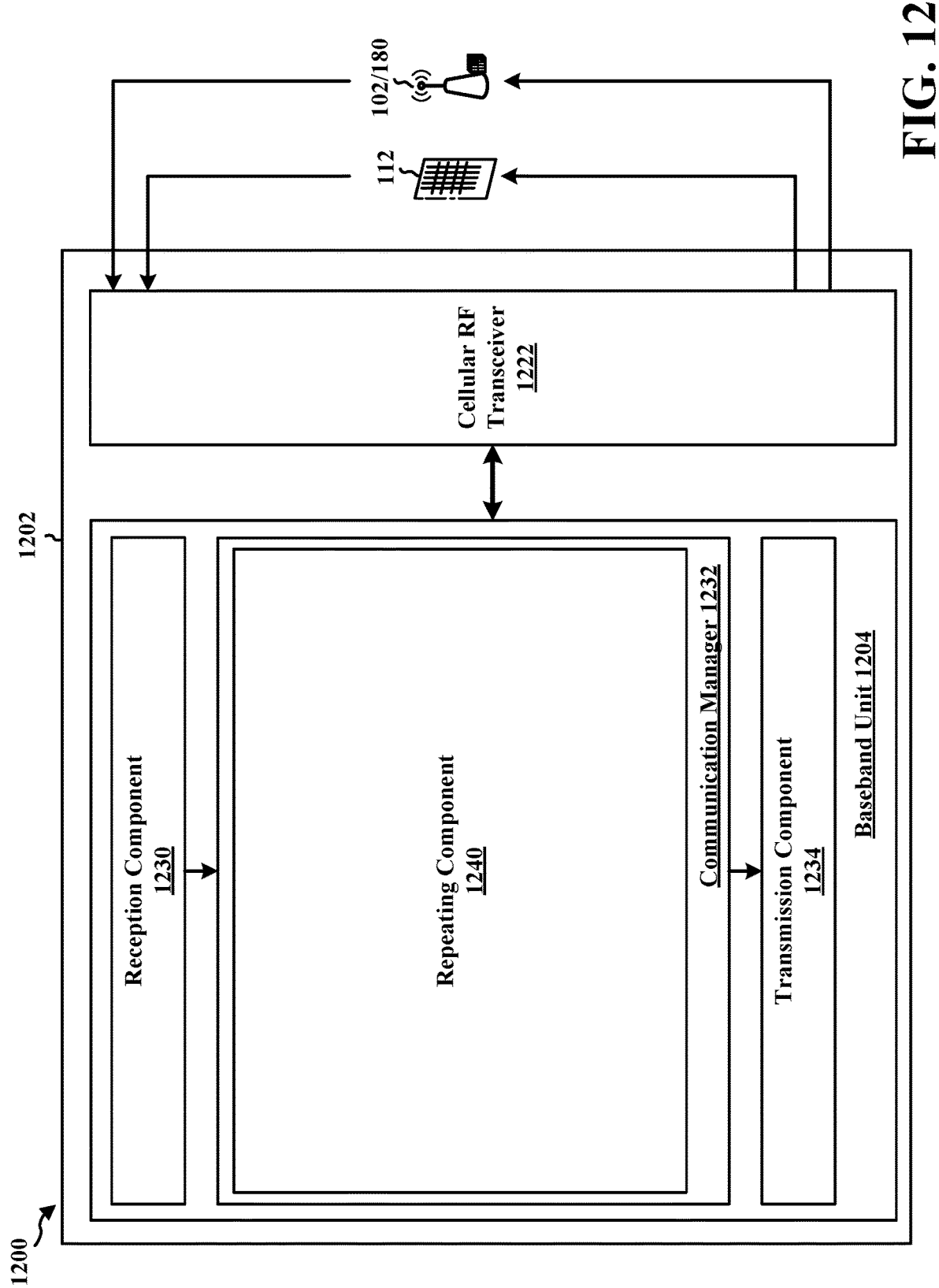
FIG. 12 is a diagram illustrating an example of a hardware implementation for an example apparatus.

FIG. 12 is a diagram 1200 illustrating an example of a hardware implementation for an apparatus 1202. The apparatus 1202 may be a node including an RU and a control entity, a component of a node, or may implement node functionality. In some aspects, the apparatus 1202 may include a baseband unit 1204. The baseband unit 1204 may communicate through a cellular RF transceiver 1222 with the reflective surface 112 or the base station 102/180. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a repeating component 1240 that may be configured to receive, from a base station at a control entity of the node, an indication of at least one obstruction for communication via at least one reflective surface, the indication indicating to the control entity to utilize an RU of the node and the at least one reflective surface for communication, e.g., as described in connection with 902 in FIGS. 9 and 1002 in FIG. 10. The repeating component 1240 may be configured to configure, upon receiving the indication of the at least one obstruction, the RU and the at least one reflective surface for communication with the base station, e.g., as described in connection with 904 in FIGS. 9 and 1004 in FIG. 10. The repeating component 1240 may be configured to control, based on the indication, the at least one reflective surface for communication with the base station via the RU or with one or more UEs, e.g., as described in connection with 1006 in FIG. 10. The repeating component 1240 may be configured to forward communication received from, or forward communication to, the base station via the RU and the at least one reflective surface based on the at least one obstruction for communication, e.g., as described in connection with 906 in FIGS. 9 and 1008 in FIG. 10.

The apparatus may include additional components that perform each of the blocks of the algorithm in the flowcharts of FIGS. 7, 9, and 10. As such, each block in the flowcharts of FIGS. 7, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for receiving, from a base station at a control entity of the node, an indication of at least one obstruction for communication via at least one reflective surface, the indication indicating to the control entity to utilize an RU of the node and the at least one reflective surface for communication. The apparatus 1202 may include means for configuring, upon receiving the indication of the at least one obstruction, the RU and the at least one reflective surface for communication with the base station. The apparatus 1202 may include means for forwarding communication received from, or forwarding communication to, the base station via the RU and the at least one reflective surface based on the at least one obstruction for communication.

In one configuration, the at least one obstruction for communication may be associated with an absence of a line-of-sight between the base station and the at least one reflective surface. In one configuration, no obstruction for communication may exist between the base station and the node. In one configuration, no obstruction for communication may exist between the node and the at least one reflective surface. In one configuration, the apparatus 1202 may include means for controlling, based on the indication, the at least one reflective surface for communication with the base station via the RU or with one or more UEs. In one configuration, the RU may be associated with one or more beams toward the base station or the at least one reflective surface. Each of the one or more beams may be fixed or steerable. In one configuration, the control entity of the node may control the RU based on the indication. In one configuration, the control entity may control at least one of an activation state or a direction of the one or more beams associated with the RU. In one configuration, the control entity may control the at least one of the activation state or the direction of the one or more beams associated with the RU based on the indication. In one configuration, a transmit power of at least one transmit beam of the RU toward the at least one reflective surface may be below a predefined threshold.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Aspects described herein may relate to a node including an RU and a control entity. The node may receive, from a base station at a control entity of the node, an indication of at least one obstruction for communication via at least one reflective surface. The indication may indicate to the control entity to utilize an RU of the node and the at least one reflective surface for communication. The node may configure, upon receiving the indication of the at least one obstruction, the RU and the at least one reflective surface for communication with the base station. The node may forward communication received from, or forward communication to, the base station via the RU and the at least one reflective surface based on the at least one obstruction for communication. Accordingly, with the use the node including the RU and the control entity, wireless communications between the base station and the UE may properly operate via the RU and the reflective surface, even though there may be an obstruction for communication between the base station and the reflective surface, and between the base station and the UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a base station including at least one processor coupled to a memory and configured to detect at least one obstruction for communication via at least one reflective surface, the at least one reflective surface being associated with a node, the node including an RU and a control entity; transmit, to the control entity of the node, an indication of the at least one obstruction for communication via the at least one reflective surface, the indication indicating to the control entity to utilize the RU and the at least one reflective surface for communication; and transmit communication to, or receive communication from, one or more UEs via the RU and the at least one reflective surface based on the at least one obstruction for communication.

Aspect 2 is the apparatus of aspect 1, where the at least one obstruction for communication is associated with an absence of a line-of-sight between the base station and the at least one reflective surface.

Aspect 3 is the apparatus of any of aspects 1 and 2, where no obstruction for communication exists between the base station and the node.

Aspect 4 is the apparatus of any of aspects 1 to 3, where no obstruction for communication exists between the node and the at least one reflective surface.

Aspect 5 is the apparatus of any of aspects 1 to 4, where the indication configures the node to control the at least one reflective surface for communication with the base station via the RU or with the one or more UEs.

Aspect 6 is the apparatus of any of aspects 1 to 5, where the indication configures the control entity of the node to control the RU, the RU is associated with one or more fixed beams toward the base station, and an activation state of the one or more fixed beams is based on the indication.

Aspect 7 is the apparatus of any of aspects 1 to 5, where the indication configures the control entity of the node to control the RU, the RU is associated with one or more steerable beams toward the base station, and at least one of an activation state or a direction of the one or more steerable beams is based on the indication.

Aspect 8 is the apparatus of any of aspects 1 to 7, where the indication configures the control entity of the node to control the RU, the RU is associated with one or more fixed beams toward the at least one reflective surface, and an activation state of the one or more fixed beams is based on the indication.

Aspect 9 is the apparatus of any of aspects 1 to 7, where the indication configures the control entity of the node to control the RU, the RU is associated with one or more steerable beams toward the at least one reflective surface, and at least one of an activation state or a direction of the one or more steerable beams is based on the indication.

Aspect 10 is the apparatus of any of aspects 1 to 9, where based on the indication, a transmit power of at least one transmit beam of the RU toward the at least one reflective surface is below a predefined threshold.

Aspect 11 is the apparatus of any of aspects 1 to 10, further including a transceiver coupled to the at least one processor.

Aspect 12 is an apparatus for wireless communication at a node including at least one processor coupled to a memory and configured to receive, from a base station at a control entity of the node, an indication of at least one obstruction for communication via at least one reflective surface, the indication indicating to the control entity to utilize an RU of the node and the at least one reflective surface for communication; configure, upon receiving the indication of the at least one obstruction, the RU and the at least one reflective surface for communication with the base station; and forward communication received from, or forward communication to, the base station via the RU and the at least one reflective surface based on the at least one obstruction for communication.

Aspect 13 is the apparatus of aspect 12, where the at least one obstruction for communication is associated with an absence of a line-of-sight between the base station and the at least one reflective surface.

Aspect 14 is the apparatus of any of aspects 12 and 13, where no obstruction for communication exists between the base station and the node.

Aspect 15 is the apparatus of any of aspects 12 to 14, where no obstruction for communication exists between the node and the at least one reflective surface.

Aspect 16 is the apparatus of any of aspects 12 to 15, the at least one processor being further configured to: control, based on the indication, the at least one reflective surface for communication with the base station via the RU or with one or more UEs.

Aspect 17 is the apparatus of any of aspects 12 to 16, where the RU is associated with one or more beams toward the base station or the at least one reflective surface, each of the one or more beams being fixed or steerable.

Aspect 18 is the apparatus of aspect 17, where the control entity of the node controls the RU based on the indication.

Aspect 19 is the apparatus of aspect 17, where the control entity controls at least one of an activation state or a direction of the one or more beams associated with the RU.

Aspect 20 is the apparatus of aspect 19, where the control entity controls the at least one of the activation state or the direction of the one or more beams associated with the RU based on the indication.

Aspect 21 is the apparatus of any of aspects 12 to 20, where a transmit power of at least one transmit beam of the RU toward the at least one reflective surface is below a predefined threshold.

Aspect 22 is the apparatus of any of aspects 12 to 21, further including a transceiver coupled to the at least one processor.

Aspect 23 is a method of wireless communication for implementing any of aspects 1 to 22.

Aspect 24 is an apparatus for wireless communication including means for implementing any of aspects 1 to 22.

Aspect 25 is a computer-readable medium storing computer executable code, where the code when executed by a processor causes the processor to implement any of aspects 1 to 22.

What is claimed is:

1. An apparatus for wireless communication at a base station, comprising:
  at least one memory; and
  at least one processor coupled to the at least one memory and configured to:
    detect at least one obstruction for communication via at least one reflective surface, the at least one reflective surface being associated with a node, the node including a repeater unit (RU) and a control entity;
    transmit, to the control entity of the node, an indication of the at least one obstruction for communication via the at least one reflective surface, the indication indicating to the control entity to utilize the RU and the at least one reflective surface for communication, the RU being separate from the at least one reflective surface; and
    transmit, to one or more user equipments (UEs) based on the at least one obstruction for communication, a first communication via the RU for repeating the first communication to the at least one reflective surface, or receive, from the one or more UEs based on the at least one obstruction for communication, a repeated second communication via the RU and the at least one reflective surface based on the at least one obstruction for communication.

2. The apparatus of claim 1, wherein the at least one obstruction for communication is associated with an absence of a line-of-sight between the base station and the at least one reflective surface.

3. The apparatus of claim 1, wherein no obstruction for communication exists between the base station and the node.

4. The apparatus of claim 1, wherein no obstruction for communication exists between the node and the at least one reflective surface.

5. The apparatus of claim 1, wherein the indication configures the node to control the at least one reflective surface for communication with the base station via the RU or with the one or more UEs.

6. The apparatus of claim 1, wherein the indication configures the control entity of the node to control the RU, the RU is associated with one or more fixed beams toward the base station, and an activation state of the one or more fixed beams is based on the indication.

7. The apparatus of claim 1, wherein the indication configures the control entity of the node to control the RU, the RU is associated with one or more steerable beams toward the base station, and at least one of an activation state or a direction of the one or more steerable beams is based on the indication.

8. The apparatus of claim 1, wherein the indication configures the control entity of the node to control the RU, the RU is associated with one or more fixed beams toward the at least one reflective surface, and an activation state of the one or more fixed beams is based on the indication.

9. The apparatus of claim 1, wherein the indication configures the control entity of the node to control the RU, the RU is associated with one or more steerable beams toward the at least one reflective surface, and at least one of an activation state or a direction of the one or more steerable beams is based on the indication.

10. The apparatus of claim 1, wherein based on the indication, a transmit power of at least one transmit beam of the RU toward the at least one reflective surface is below a predefined threshold.

11. The apparatus of claim 1, further comprising a transceiver coupled to the at least one processor.

12. A method of wireless communication at a base station, comprising:
    detecting at least one obstruction for communication via at least one reflective surface, the at least one reflective surface being associated with a node, the node including a repeater unit (RU) and a control entity;
    transmitting, to the control entity of the node, an indication of the at least one obstruction for communication via the at least one reflective surface, the indication indicating to the control entity to utilize the RU and the at least one reflective surface for communication, the RU being separate from the at least one reflective surface; and
    transmitting, to one or more user equipments (UEs) based on the at least one obstruction for communication, a first communication via the RU for repeating the first communication to the at least one reflective surface, or receiving, from the one or more UEs based on the at least one obstruction for communication, a repeated second communication via the RU and the at least one reflective surface based on the at least one obstruction for communication.

13. The method of claim 12, wherein the at least one obstruction for communication is associated with an absence of a line-of-sight between the base station and the at least one reflective surface.

14. The method of claim 12, wherein no obstruction for communication exists between the base station and the node.

15. The method of claim 12, wherein no obstruction for communication exists between the node and the at least one reflective surface.

16. An apparatus for wireless communication at a node, comprising:
    at least one memory; and
    at least one processor coupled to the at least one memory and configured to:
        receive, from a base station at a control entity of the node, an indication of at least one obstruction for communication via at least one reflective surface, the indication indicating to the control entity to utilize a repeater unit (RU) of the node and the at least one reflective surface for communication;
        configure, upon receiving the indication of the at least one obstruction, the RU and the at least one reflective surface for communication with the base station, the RU being separate from the at least one reflective surface; and
        forward a first communication received from the base station to the at least one reflective surface via the RU for repeating the first communication to the at least one reflective surface based on the at least one obstruction for communication, or forward a second communication received from the at least one reflective surface and repeated by the RU to the base station based on the at least one obstruction for communication.

17. The apparatus of claim 16, wherein the at least one obstruction for communication is associated with an absence of a line-of-sight between the base station and the at least one reflective surface.

18. The apparatus of claim 16, wherein no obstruction for communication exists between the base station and the node.

19. The apparatus of claim 16, wherein no obstruction for communication exists between the node and the at least one reflective surface.

20. The apparatus of claim 16, the at least one processor being further configured to:
    control, based on the indication, the at least one reflective surface for communication with the base station via the RU or with one or more user equipments (UEs).

21. The apparatus of claim 16, wherein the RU is associated with one or more beams toward the base station or the at least one reflective surface, each of the one or more beams being fixed or steerable.

22. The apparatus of claim 21, wherein the control entity of the node controls the RU based on the indication.

23. The apparatus of claim 21, wherein the control entity controls at least one of an activation state or a direction of the one or more beams associated with the RU.

24. The apparatus of claim 23, wherein the control entity controls the at least one of the activation state or the direction of the one or more beams associated with the RU based on the indication.

25. The apparatus of claim 16, wherein a transmit power of at least one transmit beam of the RU toward the at least one reflective surface is below a predefined threshold.

26. The apparatus of claim 16, further comprising a transceiver coupled to the at least one processor.

27. A method of wireless communication at a node, comprising:
- receiving, from a base station at a control entity of the node, an indication of at least one obstruction for communication via at least one reflective surface, the indication indicating to the control entity to utilize a repeater unit (RU) of the node and the at least one reflective surface for communication;
- configuring, upon receiving the indication of the at least one obstruction, the RU and the at least one reflective surface for communication with the base station, the RU being separate from the at least one reflective surface; and
- forwarding a first communication received from the base station to the at least one reflective surface via the RU for repeating the first communication to the at least one reflective surface based on the at least one obstruction for communication, or forwarding a second communication received from the at least one reflective surface and repeated by the RU to the base station based on the at least one obstruction for communication.

28. The method of claim 27, wherein the at least one obstruction for communication is associated with an absence of a line-of-sight between the base station and the at least one reflective surface.

29. The method of claim 27, wherein no obstruction for communication exists between the base station and the node.

30. The method of claim 27, wherein no obstruction for communication exists between the node and the at least one reflective surface.

* * * * *